(12) United States Patent
Maffeis

(10) Patent No.: US 8,033,025 B2
(45) Date of Patent: Oct. 11, 2011

(54) SHEARING TOOL WITH DEVICE FOR DETECTING CONCLUSION OF ACTION

(75) Inventor: Giuseppe Maffeis, Brescia (IT)

(73) Assignee: GIMATIC S.p.A., Brescia (IT)

( * ) Notice: Subject to any disclaimer, the term of this patent is extended or adjusted under 35 U.S.C. 154(b) by 1649 days.

(21) Appl. No.: 10/940,526

(22) Filed: Sep. 14, 2004

(65) Prior Publication Data

US 2005/0104396 A1 May 19, 2005

(30) Foreign Application Priority Data

Oct. 10, 2003 (IT) .............................. BS2003A0093

(51) Int. Cl.
*B26B 15/00* (2006.01)

(52) U.S. Cl. ........... 30/228; 30/245; 30/272.1; 30/277.4

(58) Field of Classification Search ............ 30/180, 30/187, 210, 227, 228, 245, 272.1, 277.4, 30/209
See application file for complete search history.

(56) References Cited

U.S. PATENT DOCUMENTS

| | | | | | |
|---|---|---|---|---|---|
| 3,893,237 | A | * | 7/1975 | Jahnke | 30/228 |
| 4,311,041 | A | * | 1/1982 | Reid et al. | 73/117.3 |
| 4,728,354 | A | * | 3/1988 | Vilk et al. | 65/334 |
| 5,002,135 | A | * | 3/1991 | Pellenc | 173/170 |
| 5,282,378 | A | * | 2/1994 | Kimura | 72/453.15 |
| 6,089,111 | A | * | 7/2000 | Machijima | 73/866.5 |
| 6,571,681 | B2 | * | 6/2003 | Sakurai | 92/5 R |
| 6,729,214 | B2 | * | 5/2004 | Otsuka et al. | 83/56 |
| 6,755,115 | B2 | * | 6/2004 | Stoll et al. | 91/363 R |
| 2002/0005099 | A1 | * | 1/2002 | Otsuka et al. | 83/13 |
| 2002/0100182 | A1 | * | 8/2002 | Sakurai | 33/705 |
| 2002/0100336 | A1 | * | 8/2002 | Sakurai | 73/866.5 |
| 2003/0047065 | A1 | * | 3/2003 | Stoll et al. | 91/361 |

* cited by examiner

*Primary Examiner* — Clark F. Dexter
(74) *Attorney, Agent, or Firm* — McGlew and Tuttle, P.C.

(57) ABSTRACT

The invention concerns a shearing or gripping tool which comprises a body with a proximal end and a distal end and defining an internal chamber for a drive piston for actuating the shearing or gripping tool which move between an idle and active position in answer to the movements of the piston between the retracted and forward positions. Sensitive elements to detect at least the forward position of the piston in its respective chamber and in the same way the active position of the shearing or gripping tools in order to signal the effective fulfilment of their action, are associated with the proximal part of the body.

16 Claims, 4 Drawing Sheets

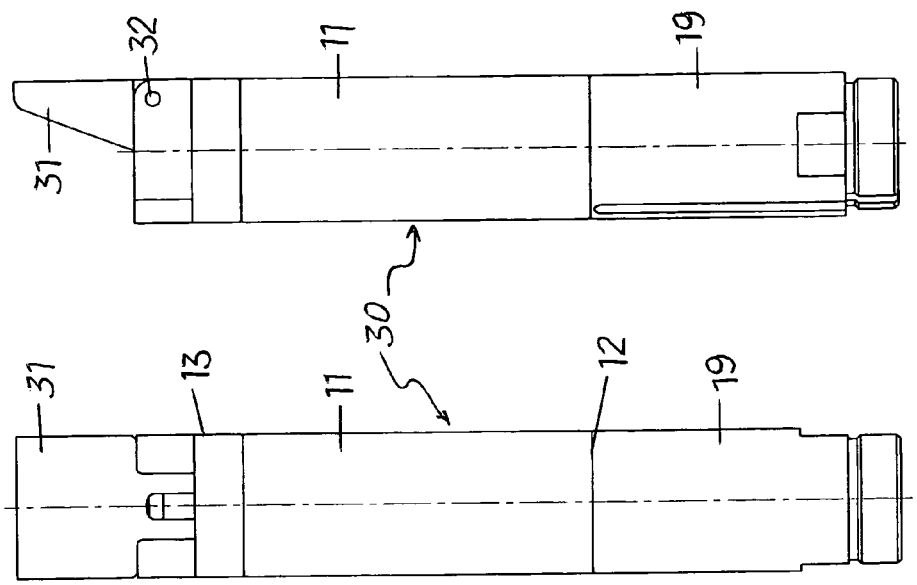
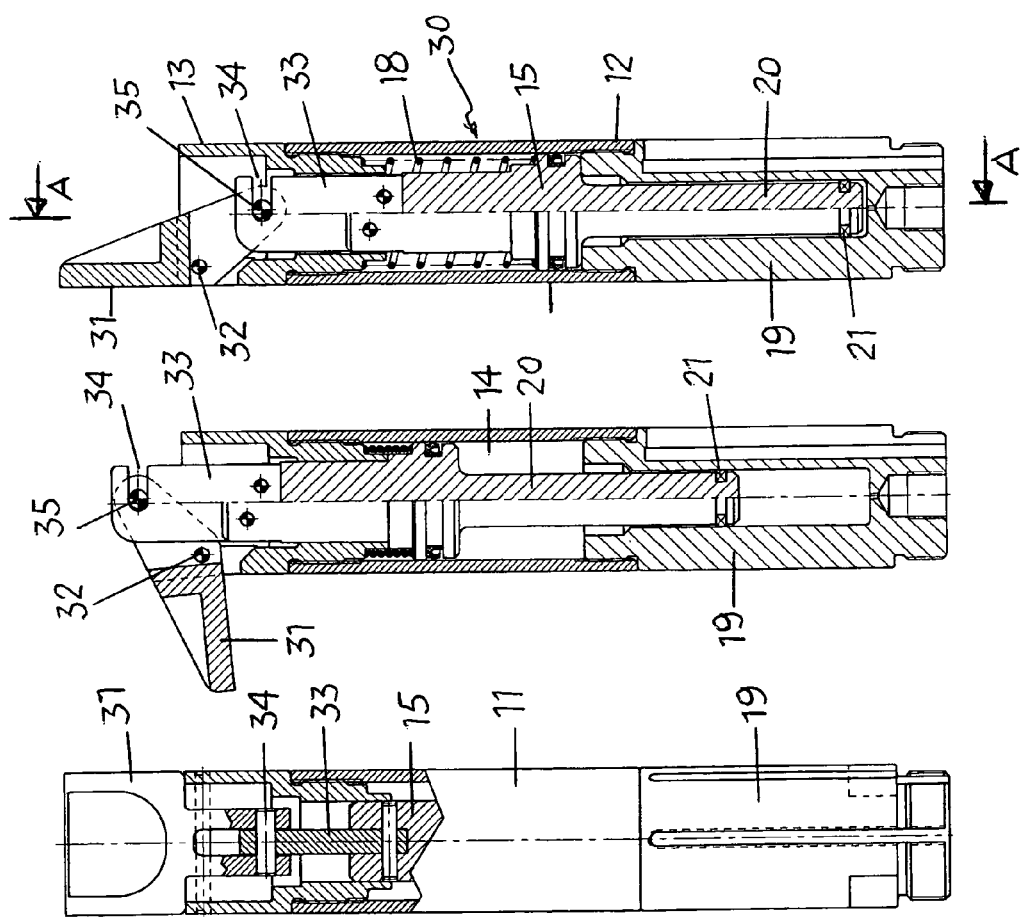
FIG. 5
FIG. 6
FIG. 9
FIG. 10
FIG. 11

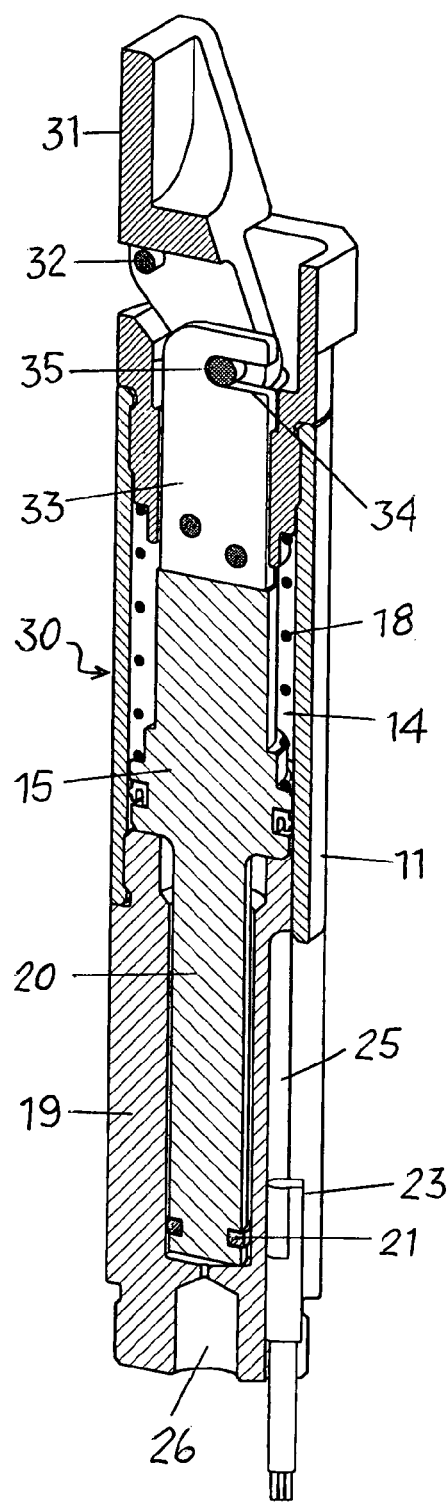
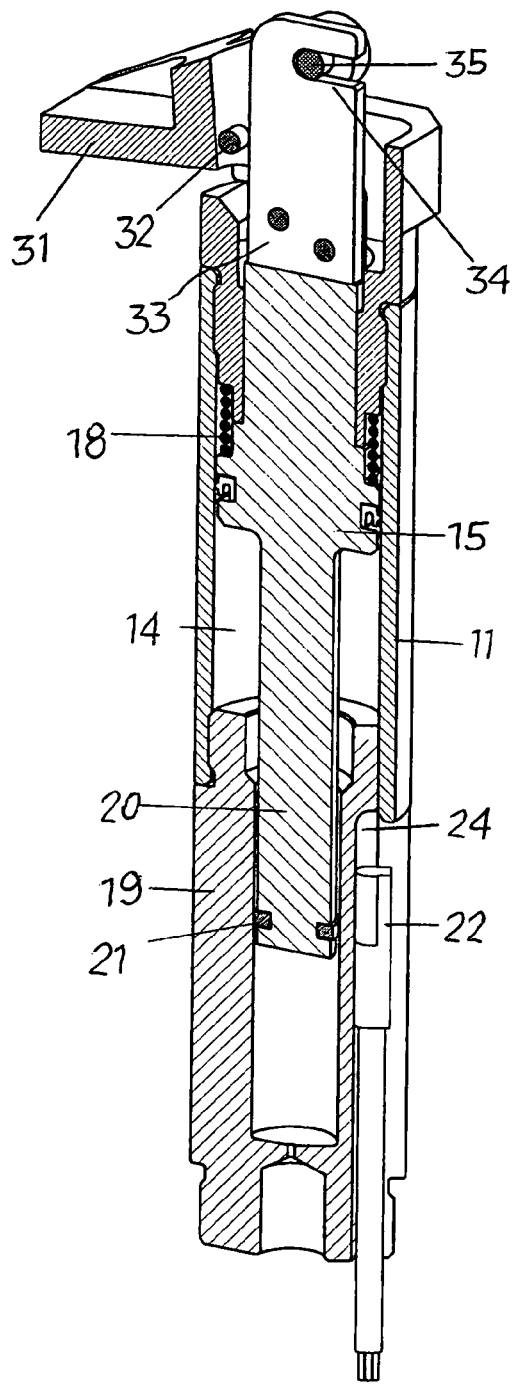
FIG. 7
FIG. 8

SHEARING TOOL WITH DEVICE FOR DETECTING CONCLUSION OF ACTION

FIELD OF THE INVENTION

This invention concerns the shearing or gripping tools used in particular, but not exclusively, on robotised equipment and where it is necessary to detect and indicate that the action of every tool used in repetitive automated actions has been fully completed.

STATE OF THE TECHNIQUE

Shearing tools, such as cutting nippers, and gripper, blocking or extraction tools, such as so-called one finger grippers, each operated by a single or double operated piston, driven by a fluid under pressure are already known.

In particular, among the shearing tools in the cutting nipper configuration, there is one which includes a outer body, a piston housed and moving alternately in said body and a pair of cutter blades mounted and oscillating on a common axis supported by said body, protruding from the end of the latter and controlled directly by the piston for their cutting action. Such tool is usually assembled and supported in the work position within the sphere of an operating fixture by means of a bracket which embraces the body.

In some operations or automated machining processes, detection that the shearing action on the part of the tool has taken place is required, to prevent malfunction of the equipment it is installed in and/or the production of items which are faulty or have to be rejected.

The same problems are found in the abovementioned gripper, blocking or extraction tools controlled by alternating movements of a piston, whose failure or incomplete action may cause malfunction or rejection in the involved production process.

A method for discovering the effective, completed action of said tools may consist in detecting, by way of the outer body, and by means of appropriate sensors, the position of the control piston and correspondingly the final, active position of the cutter blades or gripper finger, depending on the tool being used. However, application directly on the body of a means of detecting the position of the piston is often impossible or even obstructed by the presence of the supporting bracket around the body and often impracticable without the disadvantage of having to increase the external dimensions/diameter of the body or reduce the bore of the chamber of the piston limiting, in this case, the capacity of the tool.

OBJECTS AND SUMMARY OF THE INVENTION

The present invention has been conceived to avoid the problems and disadvantages above complained in relation to the prior art used on shearing and gripping tools.

In fact one of the objects of the invention is to provide the conditions to detect the completion of the action of the type of shearing or gripping tools taken into consideration, without having to apply any means of detection to their body, so that the body is free to receive any support device.

Another object of the invention is to propose and provide a shearing or gripper tool equipped including additional means for controlling the position of the drive piston and at the same time of the implements it drives, which means are positioned so as neither to have an effect on the normal external dimensions nor on the bore of the body of the tool.

Yet another object of the invention is to improve the connecting means between the control piston and the gripper finger in a blocking or extraction tool.

These objectives and implicit advantages involved are reached in a shearing or gripping tool comprising an outer body with a proximal end and a distal end and defining an internal chamber, a single or double acting piston, housed in said chamber and moving between a retracted and a forward position, and shearing or gripper means driven by said piston and moving between an idle and an active position in answer to the movements of the piston between the retracted and forward positions, and wherein the proximal part of said outer body is associated with sensitive elements to detect at least the forward position of the piston in said internal chamber and in the same way at least the active position of said shearing or gripping means to signal the completion of their action.

BRIEF DESCRIPTION OF DRAWINGS

The invention will furthermore be illustrated more in detail in the continuation of this description made in reference to the enclosed indicative and not limiting drawings, in which:

FIGS. 5 and 6 show the outside views from two different directions of the gripper tool in FIG. 4 when assembled;

FIGS. 7 and 8 show longitudinal section views in perspective of the gripper device in the inactive and active positions, respectively;

FIGS. 9 and 10 show two longitudinal section views of the gripper tool in the inactive and active positions respectively; and FIG. 11 is a longitudinal cross section in the direction of the A-A arrows in FIG. 9.

DETAILED DESCRIPTION OF THE INVENTION

Figure 1:
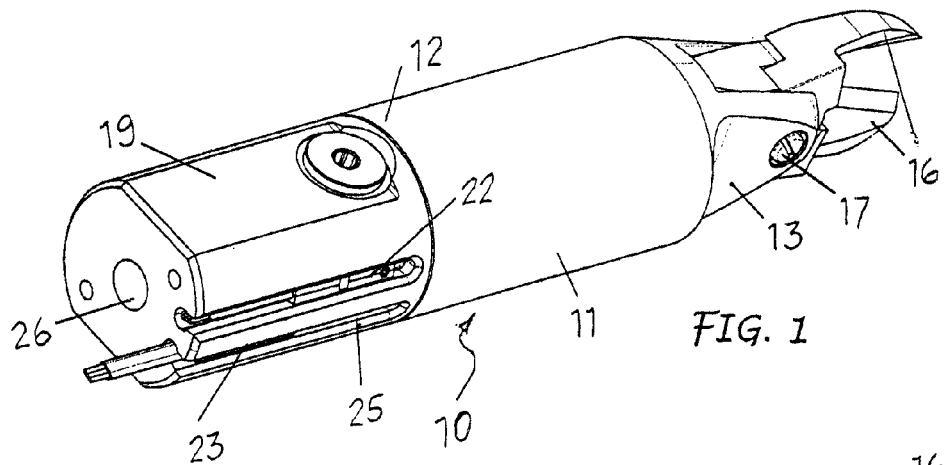
FIG. 1 is a perspective view of a shearing tool according to the invention.
Figure 2:
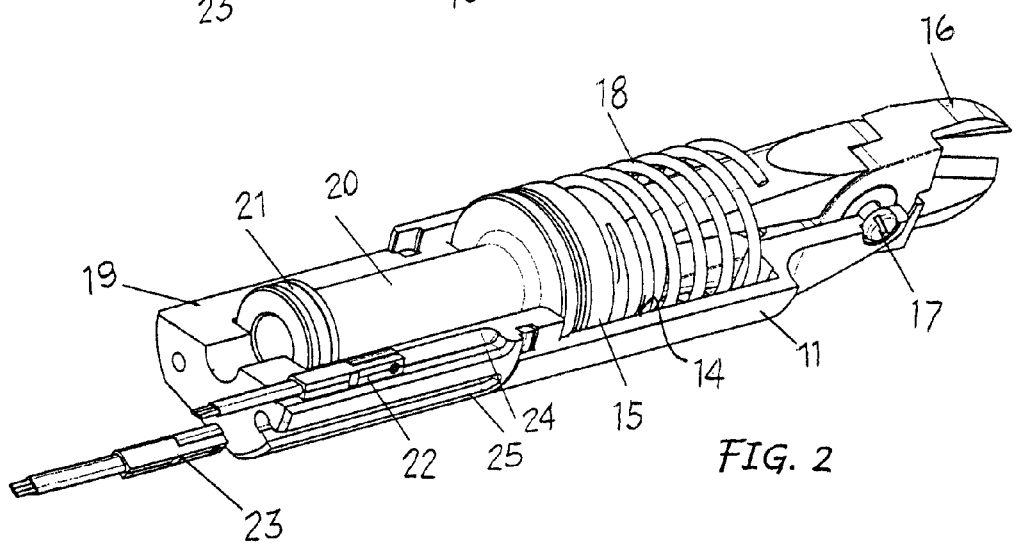
FIG. 2 is a longitudinal cross section view in perspective of the shearing tool in FIG. 1.
Figure 3:
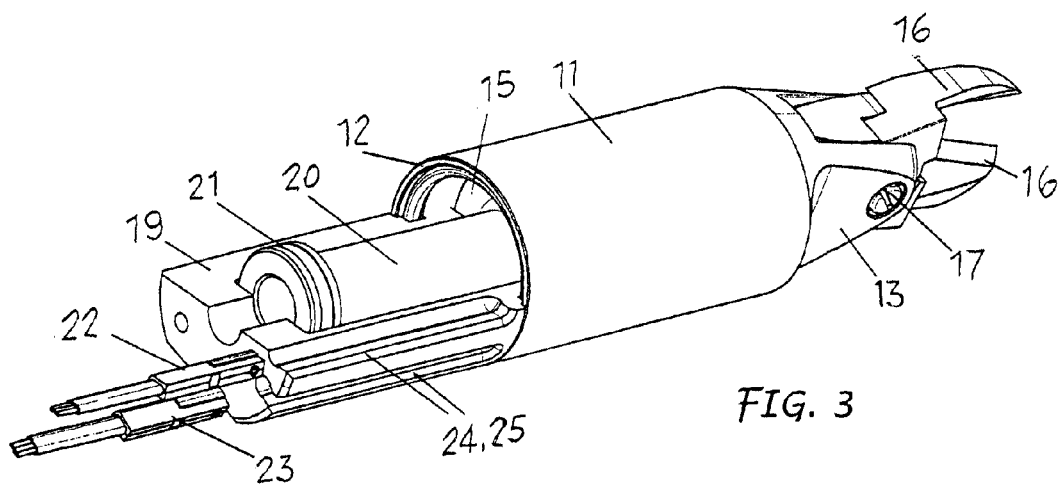
FIG. 3 is the tool in FIG. 1 again but this time cross-sectioned in the part holding the position sensors.
Figure 4:
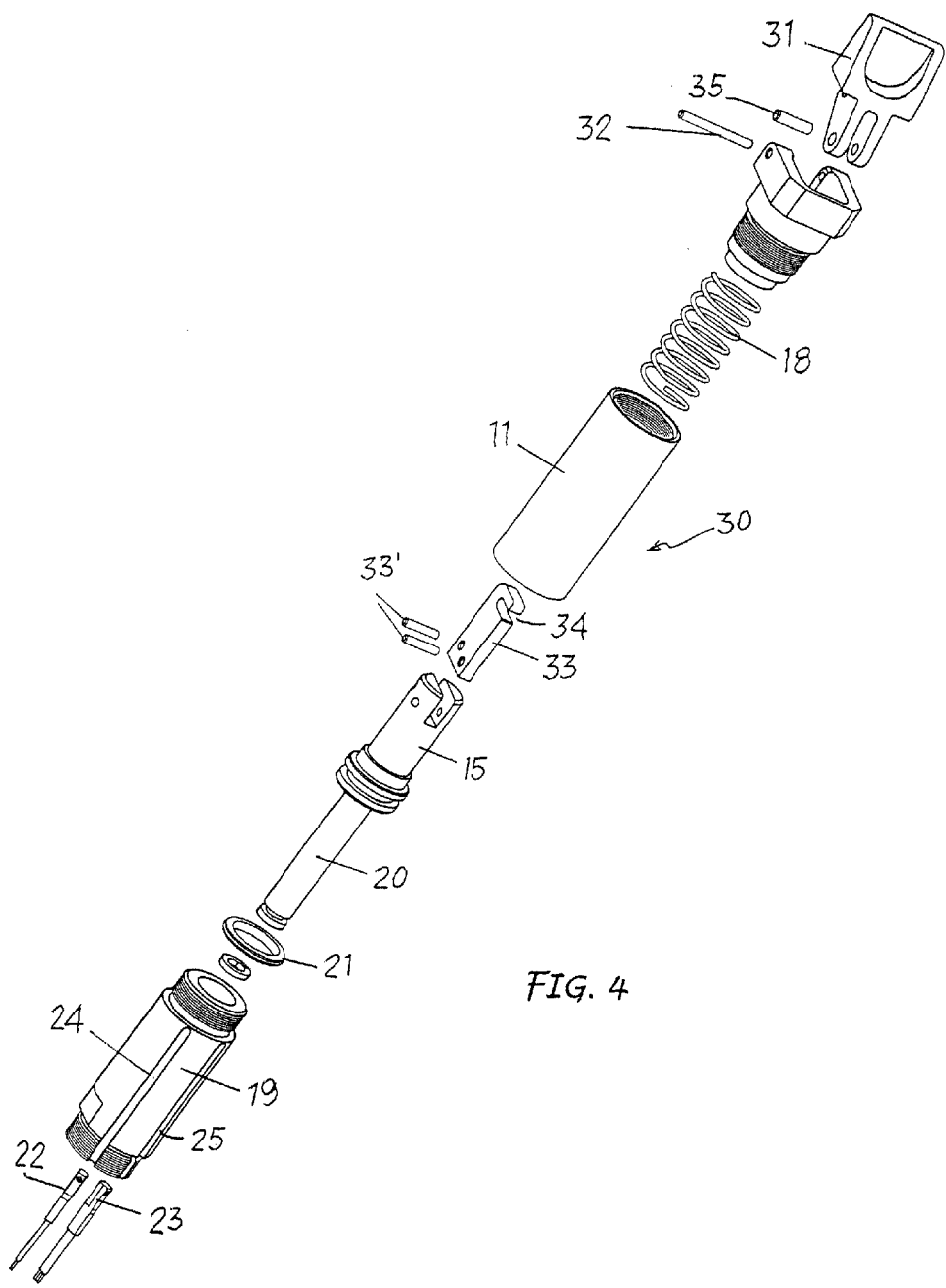
FIG. 4 is an exploded view of the components of a single finger gripper tool.

FIGS. 1 to 3 represent a shearing device or cutting nippers 10 which includes an outer tool body 11 having a proximal end 12 and a distal end 13 and internally forming a chamber 14. A piston 15 is housed and moves in this chamber to drive two facing cutter blades 16 through a well known conical coupling system. These cutter blades 16 protrude from the distal end 13 of the body 11 and are mounted oscillating around an axis of a member 17 supported by the body itself.

Even if the piston 15 may be double-acting, in the example shown it is single acting piston, moved back into a passive position by a spring 18 and forwards into an active working position by a fluid under pressure flowing into the chamber 14 behind the piston.

In compliance with the invention, means for detecting at least the forward position of the piston 15 in the chamber 14, or better to detect both the forward position and the retracted position of the piston are applied at the proximal end of the body 11, and by means of these, the active and passive positions, respectively, of the shearing blades.

In the example shown, these detecting means include a sleeve 19 fixed to or an integral part of the proximal end of the body 11, a rod 20 either associated with or an integral part of the rear of the piston, moving with the latter and extending in said sleeve, a magnetic element 21 placed on board said rod, and proximity or presence sensors 22, 23 placed in a position which can be adjusted in the respective the grooves 24, 25 formed on the outside of the sleeve 19. The external shapes and dimensions of the sleeve 19 can be identical or different from those of the tool body 11.

In preference, the fluid driving the piston 15 flows into the chamber 14 the piston 15 moves in, from a tube connected to an inlet 26 at the free end of the sleeve 19 and passes around the rod 20.

The proximity or presence sensors 22, 23 are excited and activated by the magnetic element 21 on board the rod 20 which moves with the piston 15 so as to detect both the forward and retracted positions of the piston so as to reveal the corresponding active and passive conditions of the shearing blades 16. So much so that should for any cause or reason the shearing blades 16 fail to reach their final active position and the piston 15 does not reach its forward position, the sensor 22 will not be activated by the magnetic element 21 and will thus indicate that the shearing blades have not completed their action and the cause of this malfunction requires resolving.

The present invention can be applied to a gripper, blocking or extraction tool 30 such as those shown in FIGS. 4 to 11, where same reference numbers have been used to indicate the same or equivalent parts to those described when referring to FIGS. 1 to 3.

Differently to the shearing tool 10, the piston 15 in this gripper tool 30, controls a single finger gripper 31 mounted on an oscillating pivot 32 and turning between an idle and an active position—FIGS. 6 to 9. A plate 33 is rigidly fixed to and in line with the piston 15 by means of pins 33'. Said plate 33 has a slot 34 at its end facing towards the gripper finger 31 and the latter is provided with a pin 35, parallel to the oscillating pivot 32 and housed and sliding in the slot 34 of said plate 33. In this way, the linear movements of the piston correspond to the oscillations of the gripper finger between the idle and active positions without there being devices directly attached to and oscillating in regard to the piston.

As regards to the rest, the gripper tool 30 also has a piston equipped with a rod 20 holding magnetic element 21 and is equipped with sensors 22, 23 activated by the magnetic element, positioned and operating in exactly or in a similar way to those associated with the shearing tool described above in order to detect and signal the fulfilment of the action of the gripper finger.

The invention claimed is:

1. A tool comprising:
   an outer body with a proximal end and a distal end, said outer body defining an internal chamber;
   a piston located in said chamber and moving between a retracted position and a forward position;
   a sleeve attached to said proximal end of said outer body;
   a rod fixed to said piston, said sleeve having an inner sleeve surface and a sleeve end portion, said inner sleeve surface and said sleeve end portion defining a recess, at least a portion of said rod being arranged in said recess, wherein said rod is movable in said sleeve such that said rod moves with said piston, said sleeve having an outer sleeve surface, said outer sleeve surface defining a plurality of grooves; and
   a powered shearing means driven by said piston and moving between an idle position and an active position in response to the movements of the piston between said retracted and forward positions, wherein the proximal end of said outer body is associated with sensing elements to detect at least the forward position of the piston in said internal chamber and in the same way at least the active position of said shearing means to signal the completion of an action of said shearing means, each of said sensing elements being arranged in one of said grooves, wherein each of said sensing elements is movable within said one of said grooves.

2. A tool according to claim 1, wherein a magnetic element is fixed to said rod for movement therewith, said sensing elements being activated by the magnetic element fixed to said rod so as to detect the positions of the piston in said chamber and to indicate at the same time the positions of the powered shearing means.

3. A tool according to claim 2, wherein the external shapes and dimensions of said sleeve are the same as those of the outer body of the tool.

4. A tool in accordance with claim 1, wherein said outer body has an outer body longitudinal axis, said sleeve having a sleeve longitudinal axis, said sleeve longitudinal axis being substantially aligned with said outer body longitudinal axis.

5. A tool in accordance with claim 1, wherein said rod comprises a rod end portion, said rod end portion being located adjacent to said sleeve end portion with said piston in said retracted position, said rod end portion being located at a spaced location from said sleeve end portion with said piston in said forward position.

6. A tool in accordance with claim 1, wherein said sleeve has an outer sleeve diameter, said outer body having a body outer diameter, said outer sleeve diameter being substantially equal to said body outer diameter.

7. A shearing tool in the form of shearing nippers comprising:
   a body with a proximal end and a distal end, said body defining an internal chamber;
   a piston housed in said chamber and movable between a retracted position and a forward position;
   two facing nipper blades oscillating on a common axis and supported by said body, said nipper blades protruding from the distal end of the body and moving between an idle position and an active position in response to the movements of the piston between the retracted and forward positions;
   a sleeve attached to the proximal end of said body;
   a rod fixed to a rear of the piston, moving with the piston and sliding in said sleeve;
   a magnetic element fixed to said rod for movement therewith; and
   sensors positioned and adjustable in grooves formed along said sleeve, said sensors being activated by the magnetic element fixed to said rod so as to detect the positions of the piston in said chamber and in the same way indicate the final active position of the nipper blades.

8. A shearing tool in accordance with claim 7, wherein said sleeve has a sleeve end surface and a substantially cylindrical inner surface, said sleeve end surface and said substantially cylindrical surface defining a recess, said rod being arranged in said recess, said rod having a rod end portion, said rod end portion being located adjacent to said sleeve end surface with said piston in said retracted position, said rod end portion being located at a spaced location from said sleeve end surface in said forward position.

9. A shearing tool in accordance with claim 7, wherein said sleeve has an end portion, said body having an inner surface, said end portion being in contact with said inner surface.

10. A shearing tool in accordance with claim 7, wherein said body has a body longitudinal axis, said sleeve having a sleeve longitudinal axis, said sleeve longitudinal axis being substantially aligned with said body longitudinal axis.

11. A shearing tool in accordance with claim 7, wherein said sleeve has an outer sleeve diameter, said body having a body outer diameter, said outer sleeve diameter being substantially equal to said body outer diameter.

12. A shearing tool in the form of shearing nippers, the tool comprising:
- a housing with a first end and a second end, said first end being opposite said second end, said housing comprising an inner chamber;
- a piston movably arranged in said chamber such that said piston is movable between a retracted position and a forward position;
- a first blade;
- a second blade, said first blade and said second blade oscillating about a common axis, said first blade and said second blade being supported by said housing, said first blade and said second blade extending from said first end of said housing, said first blade and said second blade moving between a non-active position and an active position, said first blade and said second blade being in said active position with said piston in said forward position, said first blade and said second blade being in said inactive position with said piston in said retracted position;
- a sleeve attached to said second end of said housing, said sleeve having an outer sleeve surface, an inner sleeve surface and an inner bottom surface, said outer sleeve surface defining at least a first groove and a second groove, said inner sleeve surface and said inner bottom surface defining a recess;
- a rod connected to said piston, said rod being movably arranged in said recess such that said rod moves with said piston, said rod being movably arranged in said recess of said sleeve, wherein a portion of said rod is arranged in said recess and another portion of said rod is in said chamber with said piston in said forward position;
- a magnetic element fixed to said rod for movement therewith;
- a first sensor movably arranged in said first groove; and
- a second sensor movably arranged in said second groove, said first sensor and said second sensor being activated by said magnetic element such that said first sensor and said second sensor detect a position of said piston in said chamber, wherein said first sensor and said second sensor detect a final position of said first blade and said second blade.

13. A shearing tool in accordance with claim 12, wherein said housing has a housing longitudinal axis, said sleeve having a sleeve longitudinal axis, said sleeve longitudinal axis being substantially aligned with said housing longitudinal axis.

14. A shearing tool in accordance with claim 12, wherein said rod comprises a rod end portion, said rod end portion being located adjacent to said inner bottom surface with said piston in said retracted position, said rod end portion being located at a spaced location from said inner bottom surface with said piston in said forward position.

15. A shearing tool in accordance with claim 12, wherein said sleeve has an outer sleeve diameter, said housing having a housing outer diameter, said outer sleeve diameter being substantially equal to said housing outer diameter.

16. A shearing tool in accordance with claim 12, wherein said sleeve has an end portion, said housing having an inner surface, said end portion being in contact with said inner surface.

* * * * *